(12) United States Patent
Guizoni, Jr. et al.

(10) Patent No.: US 11,940,205 B2
(45) Date of Patent: *Mar. 26, 2024

(54) VACUUM INSULATED STRUCTURE

(71) Applicant: WHIRLPOOL CORPORATION, Benton Harbor, MI (US)

(72) Inventors: Jose Guizoni, Jr., St. Joseph, MI (US); Devidas Balu Raskar, St. Joseph, MI (US); Fábio Ferreira Ribas, Joinville (BR); Tracy Lynn Rock, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,044

(22) Filed: Mar. 28, 2023

(65) Prior Publication Data

US 2023/0235947 A1 Jul. 27, 2023

Related U.S. Application Data

(63) Continuation of application No. 17/577,127, filed on Jan. 17, 2022, now Pat. No. 11,644,232, which is a continuation of application No. 16/599,446, filed on Oct. 11, 2019, now Pat. No. 11,287,177.

(51) Int. Cl.
*F25D 23/06* (2006.01)
*F25D 23/08* (2006.01)

(52) U.S. Cl.
CPC ......... *F25D 23/065* (2013.01); *F25D 23/085* (2013.01)

(58) Field of Classification Search
CPC .... F25D 23/065; F25D 23/066; F25D 23/082; F25D 23/085
See application file for complete search history.

(56) References Cited

U.S. PATENT DOCUMENTS

| | | | |
|---|---|---|---|
| 3,221,085 A | 11/1965 | Rill, Jr. et al. | |
| 4,745,015 A | 5/1988 | Cheng et al. | |
| 6,094,290 A * | 7/2000 | Crawford | E06B 3/6722 |
| | | | 359/275 |
| 8,402,716 B2 | 3/2013 | Tinianov | |
| 9,416,581 B2 | 8/2016 | Petrmichl et al. | |
| 9,752,376 B2 | 9/2017 | Lohwasser | |
| 10,788,128 B2 | 9/2020 | Deka et al. | |
| 10,830,527 B2 | 11/2020 | Deka et al. | |
| 10,837,697 B2 | 11/2020 | Amorim et al. | |
| 10,867,298 B1 | 12/2020 | Duke et al. | |
| 10,914,511 B2 * | 2/2021 | Naik | F25D 23/064 |

(Continued)

FOREIGN PATENT DOCUMENTS

| | | |
|---|---|---|
| EP | 3647696 A1 | 5/2020 |
| EP | 3734202 A1 | 11/2020 |

(Continued)

*Primary Examiner* — Daniel J Rohrhoff
(74) *Attorney, Agent, or Firm* — Price Heneveld LLP

(57) ABSTRACT

An insulating structure for an appliance includes a trim breaker, a first panel, a second panel, and an adhesive. The trim breaker defines a first groove and a second groove. The first panel is disposed within the first groove and is coupled to the trim breaker. The second panel is disposed within the second groove and is coupled to the trim breaker. The adhesive is disposed within the first and second grooves and is coupled to the first and second panels.

20 Claims, 8 Drawing Sheets

(56) References Cited

U.S. PATENT DOCUMENTS

| | | |
|---|---|---|
| 11,287,177 B2* | 3/2022 | Guizoni, Jr. .......... F25D 23/065 |
| 11,320,194 B2* | 5/2022 | Raskar .................... F25D 23/06 |
| 11,346,596 B2 | 5/2022 | Awachat et al. |
| 11,644,232 B2* | 5/2023 | Guizoni, Jr. .......... F25D 23/063 |
| | | 220/592.07 |
| 2010/0139195 A1 | 6/2010 | Tinianov et al. |
| 2013/0214664 A1 | 8/2013 | Yoon et al. |
| 2015/0241115 A1 | 8/2015 | Strauss et al. |
| 2015/0284987 A1* | 10/2015 | Lohwasser .............. B32B 37/12 |
| | | 428/34 |
| 2016/0258671 A1* | 9/2016 | Allard .................... F25D 23/085 |
| 2019/0128422 A1 | 5/2019 | Deka et al. |
| 2019/0162355 A1 | 5/2019 | Ernat et al. |
| 2019/0162465 A1 | 5/2019 | Allard et al. |
| 2019/0170174 A1* | 6/2019 | Deka .................... F25D 23/085 |
| 2019/0212052 A1 | 7/2019 | Hirano et al. |
| 2020/0141628 A1* | 5/2020 | Krishna ................ F25D 23/066 |
| 2021/0199368 A1 | 7/2021 | Awachat et al. |
| 2021/0071942 A1 | 8/2021 | Ickes et al. |
| 2021/0356195 A1 | 11/2021 | Deka et al. |
| 2022/0136763 A1 | 5/2022 | Guizoni et al. |
| 2022/0214099 A1 | 7/2022 | Raskar et al. |
| 2022/0299255 A1 | 9/2022 | Amorim et al. |

FOREIGN PATENT DOCUMENTS

| | | |
|---|---|---|
| WO | 2018151704 A1 | 8/2018 |
| WO | 2019108204 A1 | 6/2019 |

\* cited by examiner

VACUUM INSULATED STRUCTURE

CROSS-REFERENCE TO RELATED APPLICATIONS

The present application is a continuation of U.S. patent application Ser. No. 17/577,127 filed Jan. 17, 2022, now U.S. Pat. No. 11,644,232, which is a continuation of U.S. patent application Ser. No. 16/599,446 filed Oct. 11, 2019, now U.S. Pat. No. 11,287,177, both of which are entitled VACUUM INSULATED STRUCTURE, the entire disclosures of which is hereby incorporated herein by reference.

BACKGROUND OF THE DISCLOSURE

The present disclosure generally relates to a vacuum insulated structure, and more specifically, to a vacuum insulated structure for an appliance.

SUMMARY OF THE DISCLOSURE

According to one aspect of the present disclosure, an insulating structure for an appliance includes a trim breaker, a first panel, a second panel, and an adhesive. The trim breaker defines a first groove and a second groove. The first panel is disposed within the first groove and is coupled to the trim breaker. The second panel is disposed within the second groove and is coupled to the trim breaker. The adhesive is disposed within the first and second grooves and is coupled to the first and second panels.

According to another aspect of the present disclosure, an insulating structure for an appliance includes a glass trim breaker, a wrapper, a liner, and an adhesive. The glass trim breaker defines at least one groove. The wrapper is coupled to the trim breaker. The liner is coupled to the trim breaker and proximate to the wrapper, wherein an insulating cavity is defined between the liner and the wrapper. The adhesive is disposed within the at least one groove and is coupled to the liner and the wrapper.

According to yet another aspect of the present disclosure, an insulating structure includes a trim breaker, a liner, a wrapper, and a barrier. The trim breaker defines a first groove and a second groove. The liner is positioned within the first groove and is coupled to the trim breaker. The wrapper is coupled to the trim breaker in the second groove and is proximate to the liner. The barrier is coupled to the trim breaker and extends between the wrapper and the liner. A glass coating is disposed on the barrier.

These and other features, advantages, and objects of the present disclosure will be further understood and appreciated by those skilled in the art by reference to the following specification, claims, and appended drawings.

Figure 1:
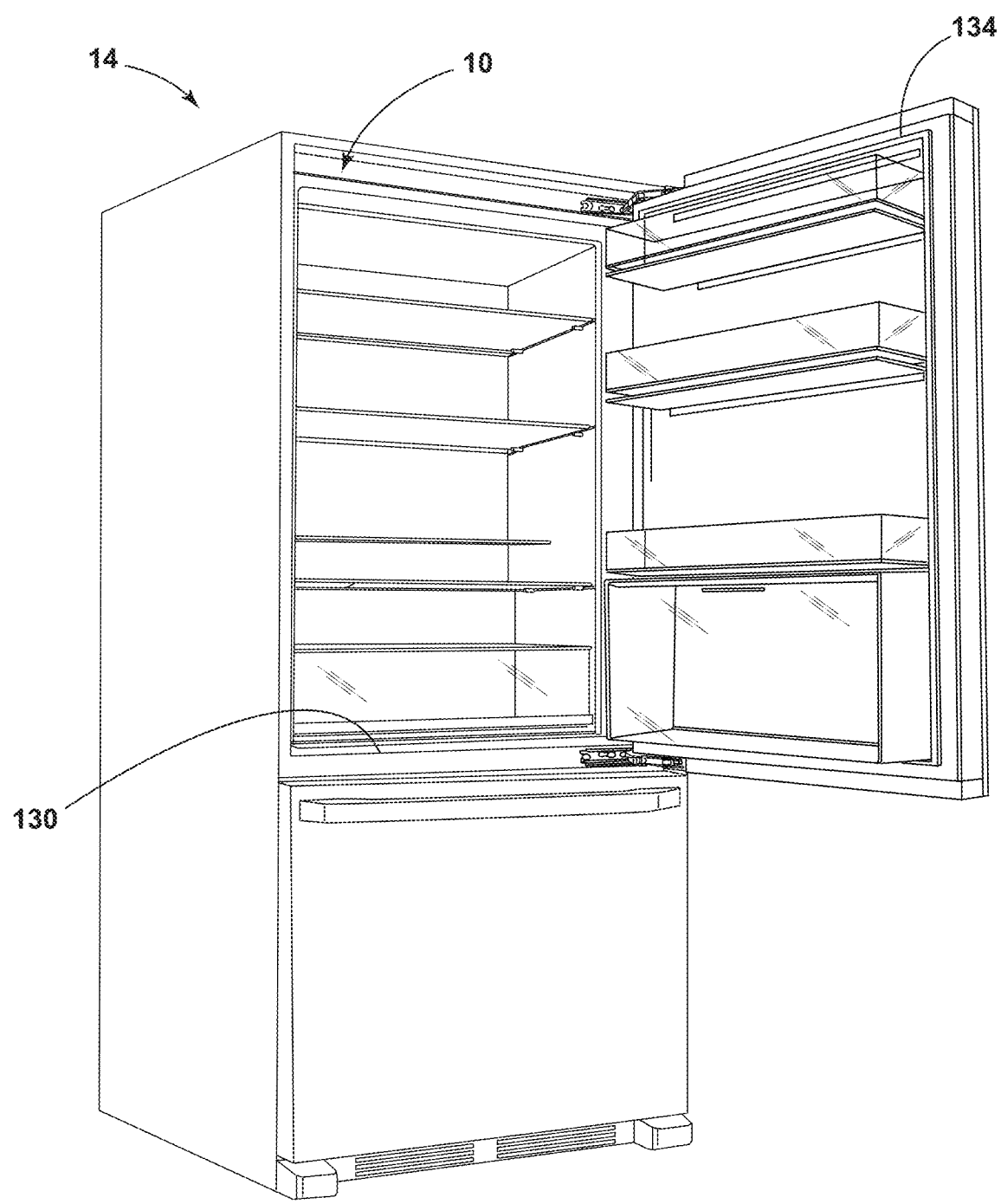
FIG. 1 is a front perspective view of an appliance of the present disclosure.
Figure 2:
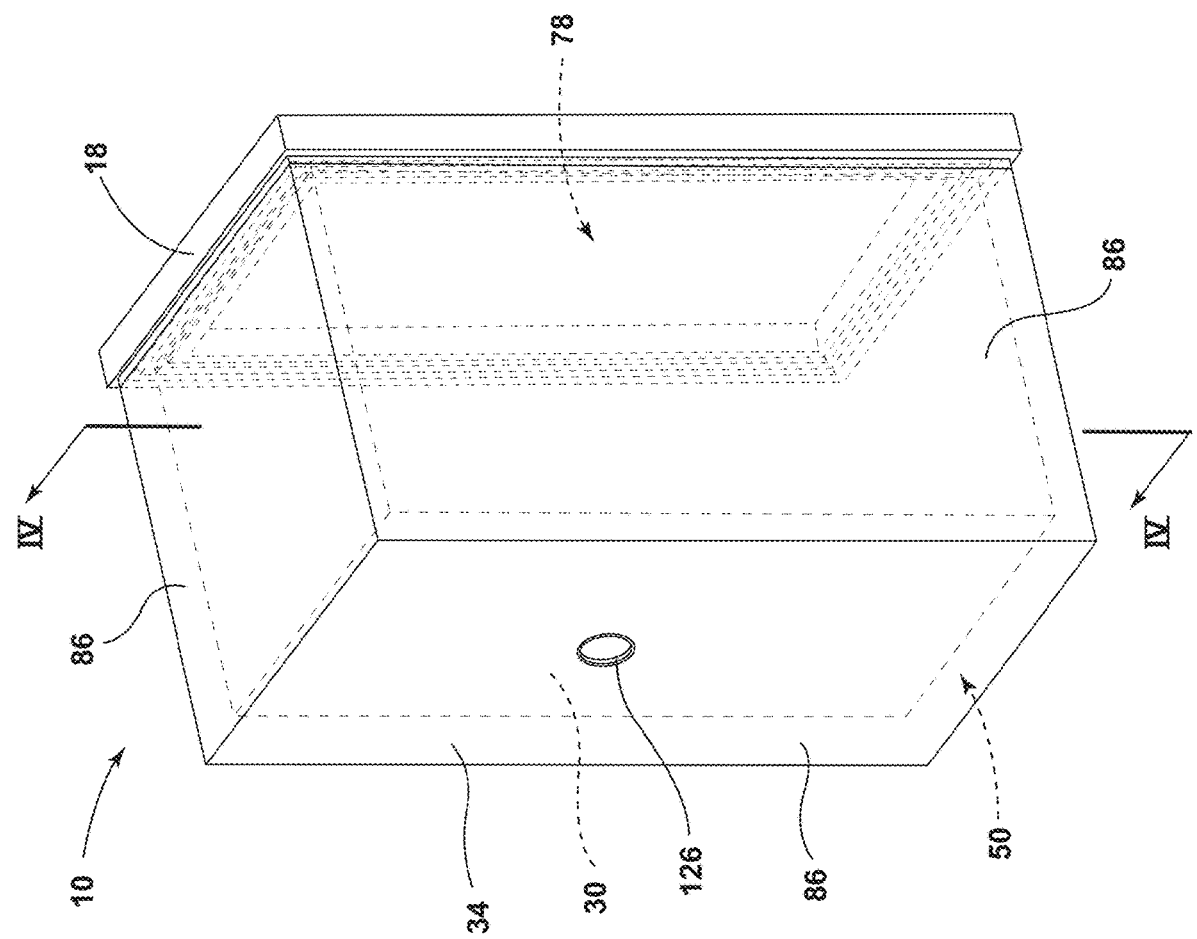
FIG. 2 is a side perspective view of an aspect of a vacuum insulated structure.
Figure 3:
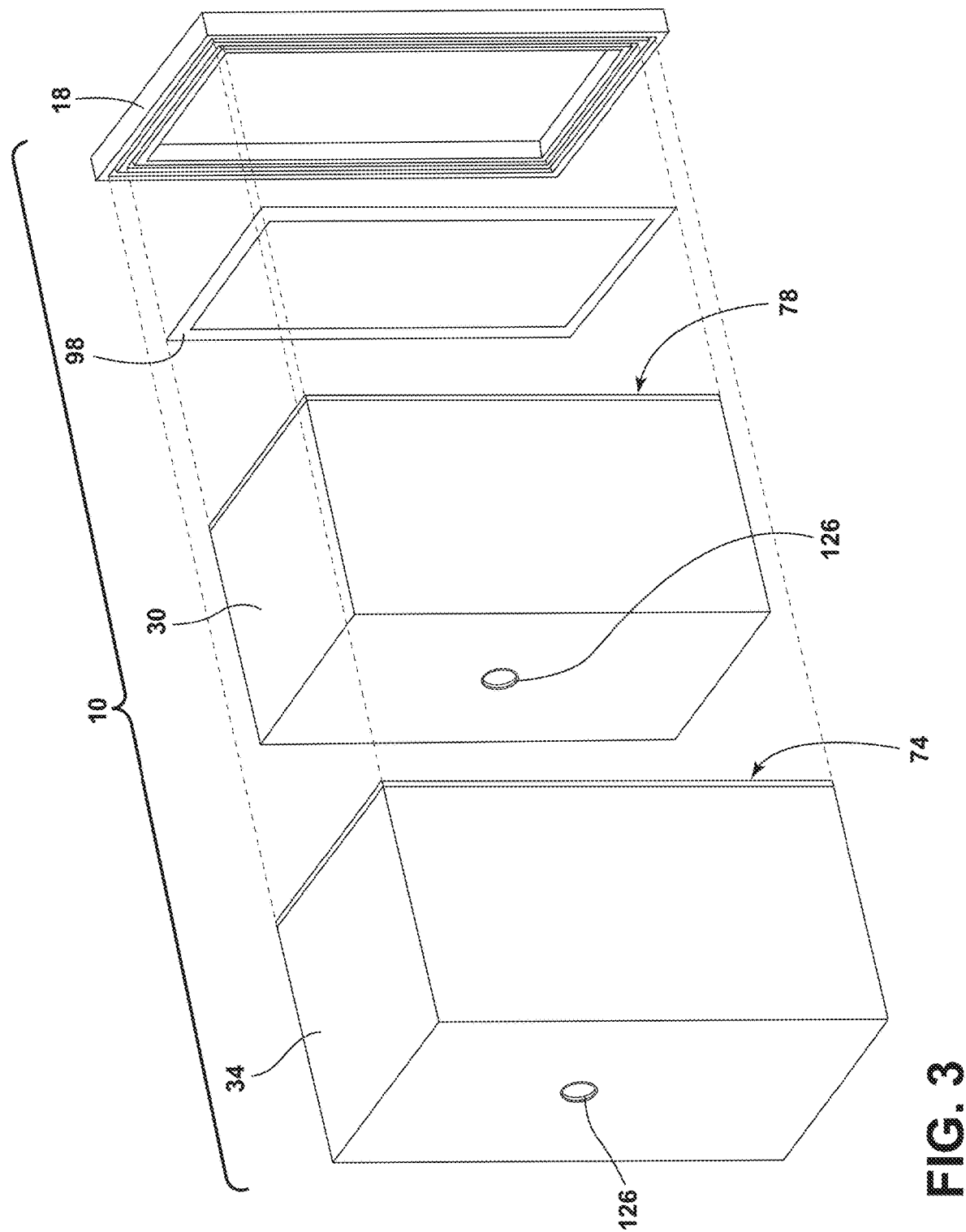
FIG. 3 is an exploded side perspective view of a vacuum insulated structure for the appliance of FIG. 2.
Figure 4:
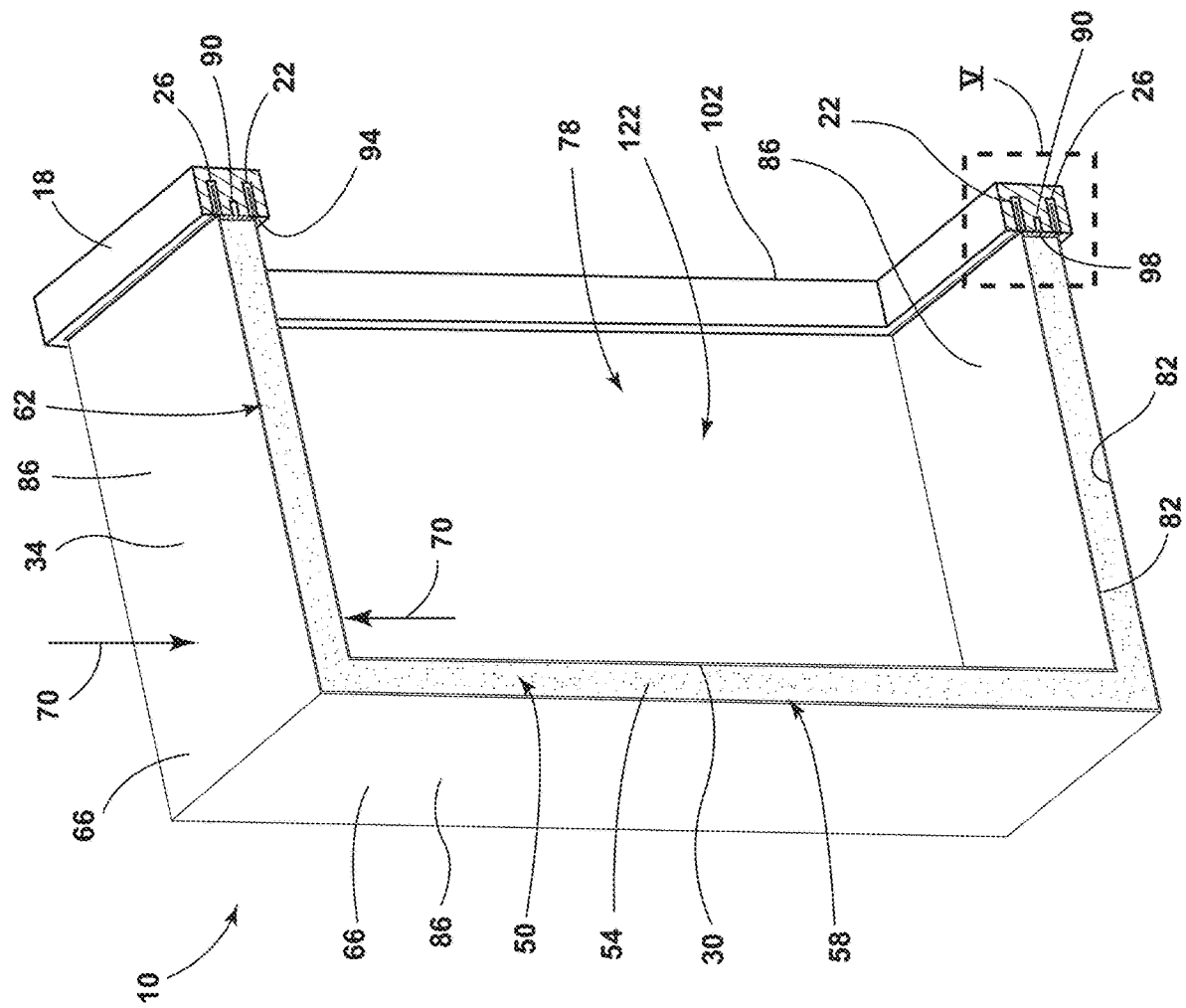
FIG. 4 is a cross-sectional view of the vacuum insulated structure of FIG. 2 taken along the line IV-IV.
Figure 5:
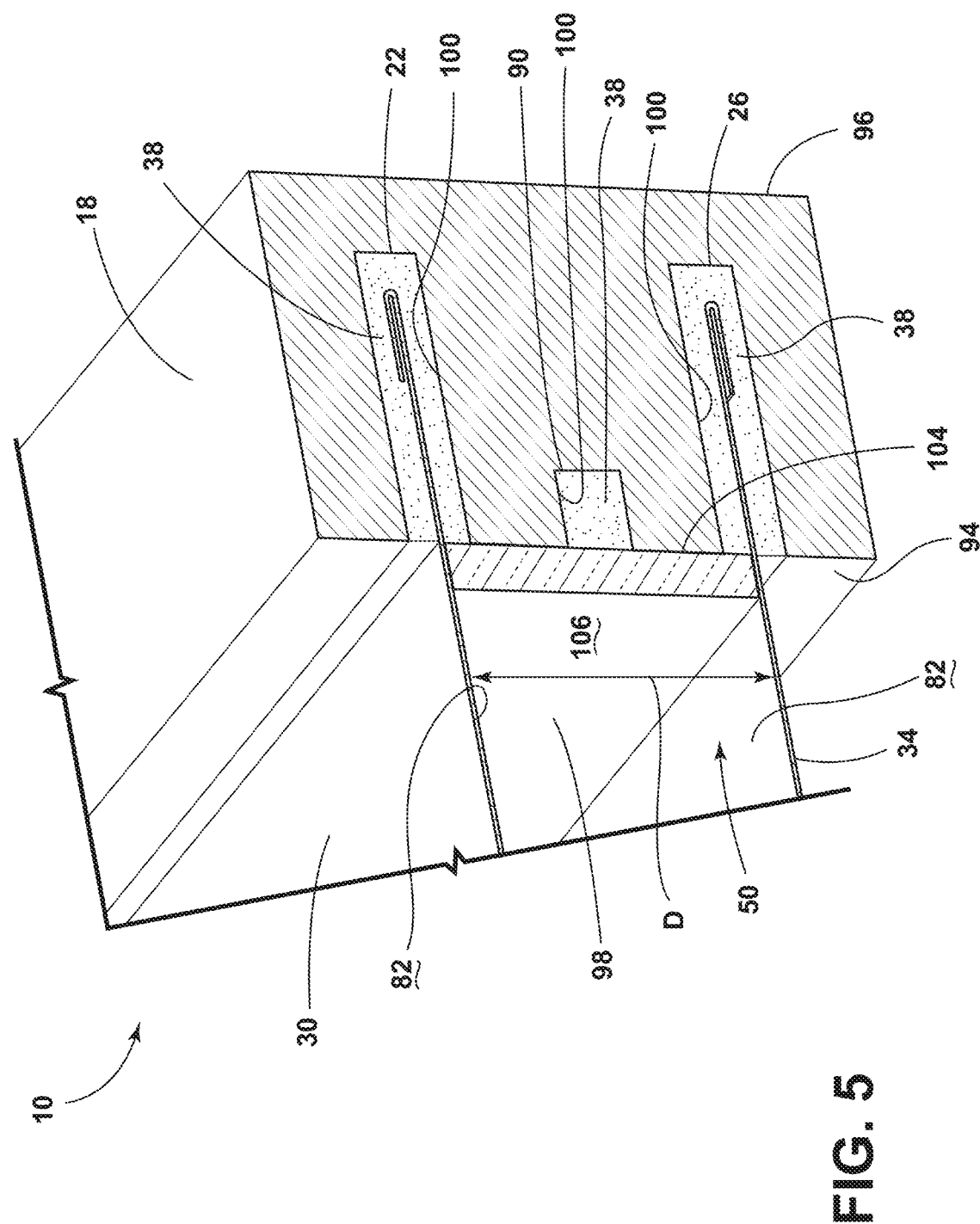
FIG. 5 is a partial expanded view of a trim breaker and a barrier of the vacuum insulated structure of FIG. 4 taken at area V.

The components in the figures are not necessarily to scale, emphasis instead being placed upon illustrating the principles described herein.

DETAILED DESCRIPTION

The present illustrated embodiments reside primarily in combinations of apparatus components related to a vacuum insulated structure. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates an insulating structure for an appliance 14. The insulating structure 10 includes a trim breaker 18 that defines a first groove 22 and a second groove 26. A first panel 30 is disposed within the first groove 22 and coupled to the trim breaker 18. A second panel 34 is disposed within the second groove 26 and coupled to the trim breaker 18. An adhesive 38 is disposed within the first and second grooves 22, 26. Additionally, the adhesive 38 is coupled to the first and second panels 30, 34.

Referring again to FIGS. 1-4, it is contemplated that the insulating structure 10 may be in the form of a vacuum insulated structural cabinet or a vacuum insulated panel that may be used as an insulation member for the appliance 14. According to various examples, the insulating structure 10 includes the first panel 30 and second panel 34, which may alternatively be referred to as a liner and a wrapper, respectively. Hereinafter, the first panel 30 is referred to as the liner 30, and the second panel 34 is referred to as the wrapper 34. The wrapper 34 and the liner 30, coupled to the trim breaker 18, define an insulating cavity 50 in which one or more insulation materials 54 may be disposed. It is generally contemplated that the insulation materials 54 are a glass-type material. However, it is also contemplated that the insulation materials 54 may be a carbon-based powder, silicon oxide-based materials, insulating gasses, and other standard insulation materials 54 as known in the art; such materials are described more fully below. The insulation materials 54 substantially fill the insulating cavity 50 forming a substantially continuous layer between the liner 30 and the wrapper 34.

In addition, an at least partial vacuum 58 is defined within the insulating cavity 50, where the at least partial vacuum 58 defines a pressure differential 62 between an exterior 66 of the insulating structure 10 and the insulating cavity 50. This pressure differential 62 serves to define an inward compressive force 70 that is exerted upon both the wrapper 34 and the liner 30 and tends to bias the wrapper 34 and the liner 30 toward the insulating cavity 50 of the insulating structure 10. The at least partial vacuum 58 within the insulating cavity 50 also tends to cause gas to infiltrate into the insulating cavity 50 from an area outside of the appliance 14. This infiltration of gas is sometimes referred to as gas permeation.

Referring again to FIGS. 2-4, as depicted in the form of a structural cabinet, the wrapper 34 has a three-dimensional shape such that a plurality of panels define a central cavity 74. Correspondingly and as depicted, the liner 30 has a plurality of surfaces defining an inner cavity 78. It is generally contemplated that the liner 30 is received within the central cavity 74 of the wrapper 34, thus partially defining the insulating cavity 50. Additionally, the wrapper 34 and the liner 30 include inner surfaces 82 and outer surfaces 86 and may be made from a material at least partially resistant to bending, biasing, or otherwise being formed in response to the inward compressive force 70. These materials for the liner 30 and the wrapper 34 may include, but are not limited to, metals, polymers, metal alloys, combinations thereof, and other similar substantially rigid materials that can be used for vacuum insulated structures within appliances. It is contemplated that the liner 30 and the wrapper 34 may also be used to form a vacuum insulated panel. In such constructions, the liner 30 is referred to as the first panel, and the wrapper 34 is referred to as the second panel, as stated above.

Referring again to FIGS. 4 and 5, it is contemplated that in addition to the first and second grooves 22, 26, the trim breaker 18 may define a third groove 90. It is generally contemplated that the trim breaker 18 defines at least one groove, which may include the first, second, and third grooves 22, 26, 90. The first and second grooves 22, 26 are configured to receive the liner 30 and the wrapper 34, respectively, to define the insulating structure 10. Additionally, the first groove 22 may alternatively be referred to as an inner groove, and the second groove 26 may be alternatively referred to as an outer groove. Further, the third groove 90 may be referred to as a central groove. Hereinafter, the first, second, and third grooves 22, 26, 90 are referred to as the inner, outer, and central grooves 22, 26, 90, respectively.

In addition, the trim breaker 18 has a receiving surface 94 and a solid surface 96. It is generally contemplated that, along with the central groove 90, the inner and outer grooves 22, 26 are defined by a receiving surface 94 of the trim breaker 18, such that the liner 30 and the wrapper 34 are received by the inner and outer grooves 22, 26, respectively. The inner and outer grooves 22, 26 are filled with the adhesive 38 configured to couple the liner 30 and the wrapper 34 to the trim breaker 18. In addition, the central groove 90, defined by receiving surface 94 of the trim breaker 18, may be filled with the adhesive 38 configured to couple a barrier 98 with the trim breaker 18. Moreover, the inner, outer, and central grooves 22, 26, 90 include interior portions 100 that contact with and receive the adhesive 38 to secure the liner 30, the barrier 98, and the wrapper 34 to the trim breaker 18. The central groove 90 may have a shallower depth than the inner and outer grooves 22, 26, such that a lesser amount of the adhesive 38 may be used to fill the central groove 90. In certain embodiments, the adhesive 38 may overflow from the central groove 90. In such an embodiment, the barrier 98 may be adhered at the central groove 90 and at the receiving surface 94. In a further alternative construction, the barrier 98 may be disposed upon the trim breaker 18 in such a way that there is no overlap of the barrier 98 with the inner and outer grooves 22, 26, whereas, as depicted, the barrier 98 slightly overhangs the inner and outer grooves 22, 26, and engages the liner 30 and the wrapper 34.

Additionally or alternatively, the trim breaker 18 may not include the central groove 90 such that the barrier 98 may be coupled directly to the receiving surface 94 of the trim breaker 18. Accordingly, the adhesive 38 may be disposed directly on a receiving surface 94 of the trim breaker 18 between the liner 30 and the wrapper 34, such that the barrier 98 may be coupled directly with the trim breaker 18. Where the adhesive 38 is disposed directly on the trim breaker 18, it is generally contemplated that the barrier 98 may couple to the trim breaker 18 regardless of the presence of the central groove 90. According to various aspects, the adhesive 38 is generally contemplated to be an epoxy adhesive 38 typically used with the barrier 98. The epoxy adhesive 38 may be used to couple the barrier 98 to the trim breaker 18 at a lower temperature compared with the higher temperatures experienced when curing other types of adhesives. As it is generally contemplated that the trim breaker 18 and the epoxy adhesive 38 used with the barrier 98 is formed from plastic, the lower curing temperature is advantageous to minimize the potential of melting the barrier 98 as a result of the otherwise higher curing temperature.

Referring again to FIGS. 4-6, the barrier 98 is provided where the plastic trim breaker 18 is used to minimize gas permeation of the insulating structure 10. The barrier 98 is a generally rectilinear shape to follow a border 102 of the insulating structure 10. As such, the barrier 98 may be one continuous piece of material that follows the shape of the trim breaker 18. The barrier 98 at least partially extends across the inner and outer grooves 22, 26 and entirely across the central groove 90 such that an adhering surface 104 is in contact with the trim breaker 18 and contacts the adhesive 38 in at least the central groove 90. In addition, an insulation-facing surface 106 of the barrier 98 is generally inwardly facing towards the insulating cavity 50, such that the insulation-facing surface 106 is typically in contact with the insulation materials 54. Edge portions 110 of the barrier 98 generally abut the liner 30 and the wrapper 34, such that the barrier 98 spans a distance D between the liner 30 and the wrapper 34 across portions of the trim breaker 18. Thus, the barrier 98 contacts with both the inner surfaces 82 of the liner 30 and the wrapper 34.

In addition, it is generally contemplated that the barrier 98 includes a coating 114 formed from a glass-type material.

Where the coating 114 is disposed on the barrier 98, it is contemplated that the gas permeation rates between the trim breaker 18 and the insulating cavity 50 are favorably diminished. The use of the coating 114 on the barrier 98, in combination with the metallic liner 30 and wrapper 34 can further diminish the rate of gas permeation into the insulating structure 10. Thus, the integrity of the insulating structure 10, whether the vacuum insulated structural cabinet or panel, may be maintained, ultimately increasing the useful life of the insulating structure 10.

The coating 114 is formed from a glass-type material and is disposed on the barrier 98. This glass-type material is contemplated to be a chalcogenide glass. Chalcogenide glass generally contains one or more chalcogens, such as sulfur, but does not contain oxygen. The use of the chalcogenide glass to form the coating 114 further minimizes oxygen exposure due to the lack of oxygen in the coating 114. To form the proper bonding of the chalcogenide coating 114, the coating 114 is contemplated to be applied to the barrier 98 while in a vacuum chamber, such that the coating 114 is applied under evacuation. The coating 114 is then cured during the curing process of the adhesive 38 for the insulating structure 10.

The application of the coating 114 to the barrier 98 further minimizes the likelihood of gas permeation into the insulating structure 10. As mentioned above, glass is generally impermeable to gases, thus applying a glass coating 114 to the barrier 98 minimizes potential permeation that may otherwise occur with the barrier 98 and a plastic trim breaker 18. The glass coating 114 along with the barrier 98 is generally used when the adhesive 38 is formed from epoxy and the trim breaker 18 is formed from plastic. Thus, the coating 114 protects the insulating structure 10 from gas permeation through otherwise gas permeable materials, such as epoxy and plastic. Additionally or alternatively, the trim breaker 18 may be formed from glass, discussed in further detail below.

Figure 7:
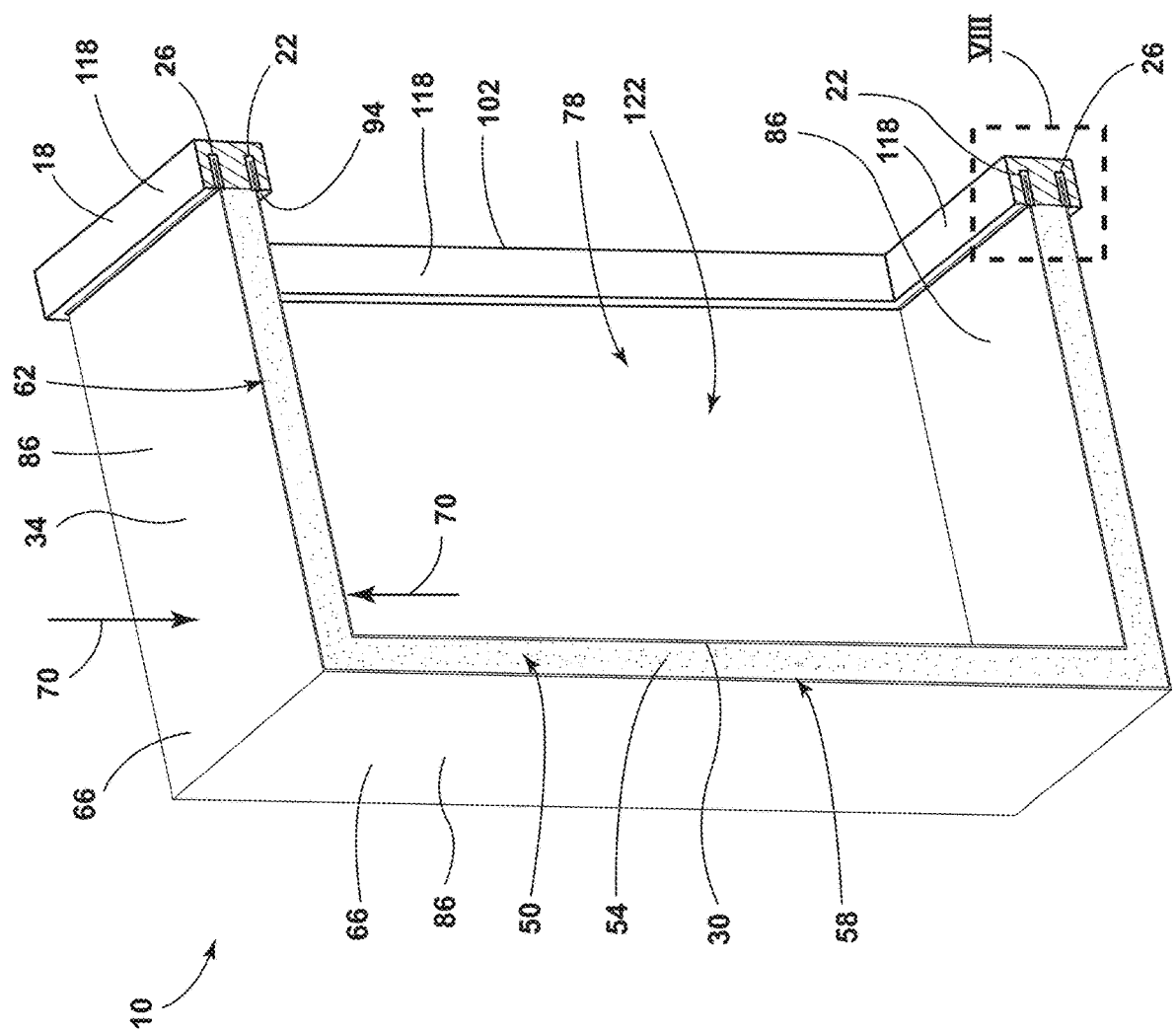
FIG. 7 is a cross-sectional view of an aspect of the vacuum insulated structure.
Figure 8:
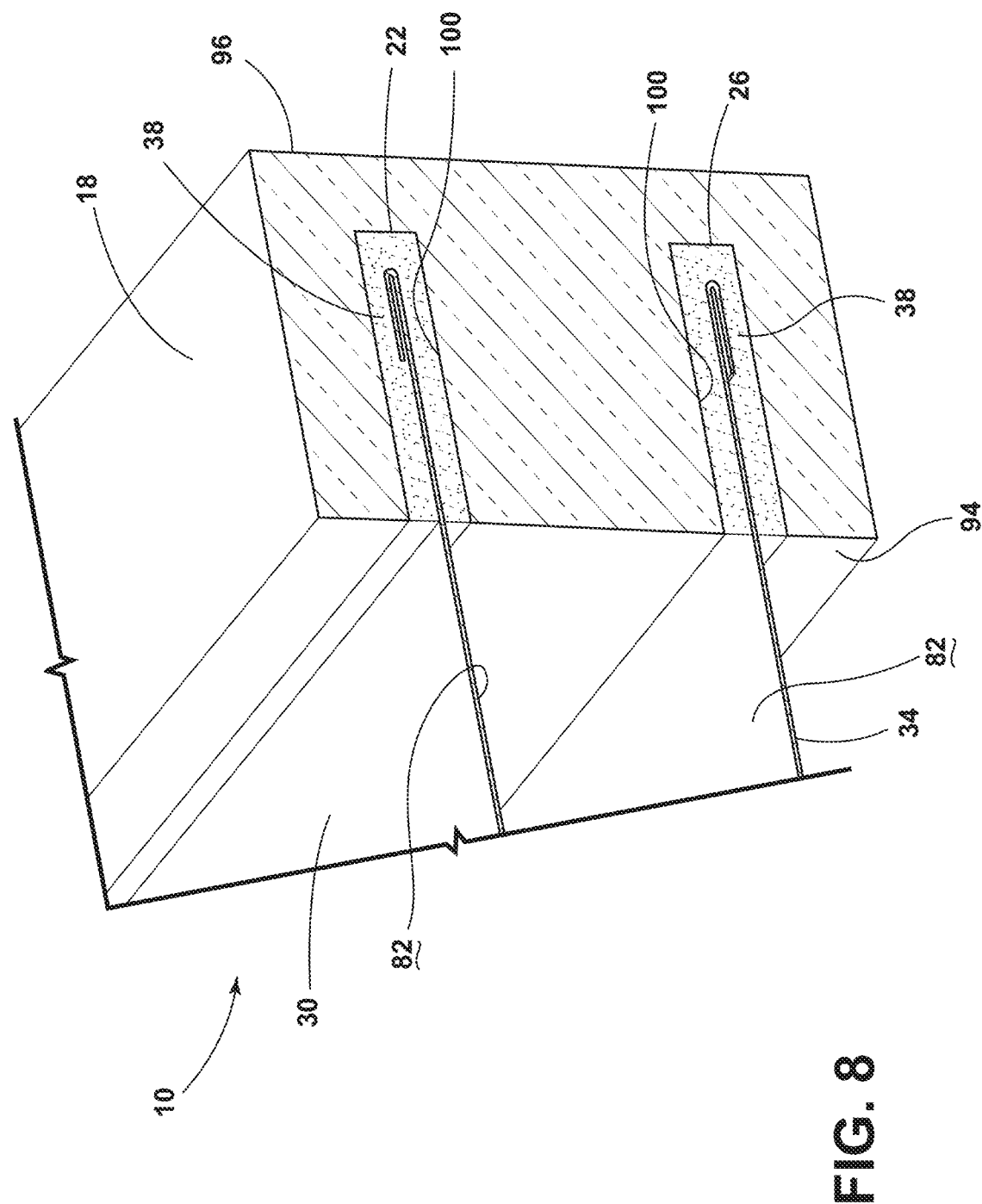
FIG. 8 is a partial expanded view of a trim breaker and a barrier of the vacuum insulated structure of FIG. 7 taken at area VIII.

Referring now to FIGS. 7 and 8, in various aspects of the device the trim breaker 18 is formed from a glass material. As depicted, the trim breaker 18 has a generally rectangular shape; however, it is contemplated that other geometric shapes known in the art may be used. A plurality of edges 118 form the border 102 of the insulating structure 10 and define an opening 122. Said another way, the border 102 of the insulating structure 10 is defined by the plurality of edges 118 of the trim breaker 18. The plurality of edges 118 further define the inner cavity 78 defined by the liner 30 by providing the border 102 outlining the inner cavity 78. Additionally, the plurality of edges 118 of the trim breaker 18 includes the receiving surface 94 and the solid surface 96, where the receiving surface 94 includes the inner and outer grooves 22, 26, such that the liner 30 and the wrapper 34 are received, respectively.

Figure 6:
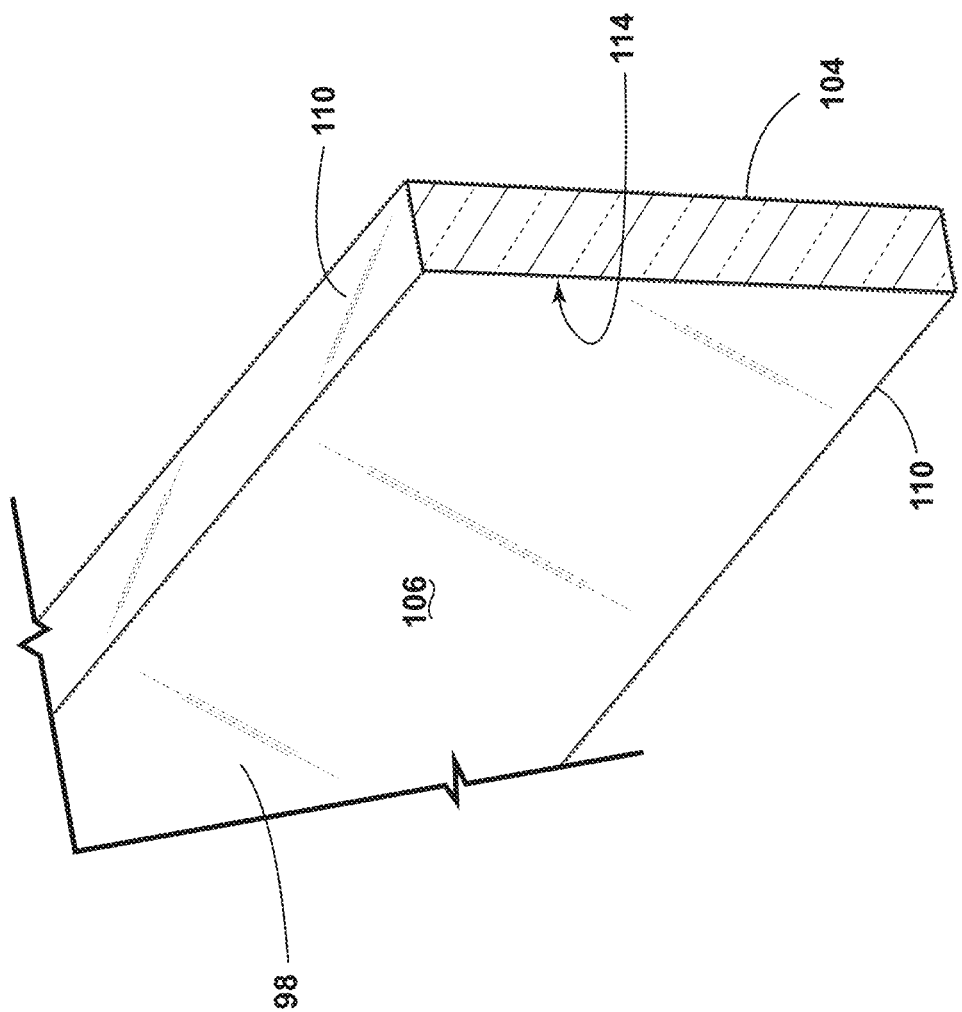
FIG. 6 is a partial expanded view of the barrier and a coating of FIG. 5.

As depicted in FIG. 8, the insulating structure 10 includes the trim breaker 18, the wrapper 34, the liner 30, and the adhesive 38. In such constructions, the adhesive 38 is a glass-frit based adhesive. Glass-frit adhesive 38 is cured under a higher temperature, such that the use of the glass trim breaker 18 provides sufficient construction for the insulating structure 10 to withstand such high curing temperatures. At such high curing temperatures, it is generally contemplated that plastics that may otherwise be used to form parts of the insulating structure 10 would melt. Thus, the combination of the glass trim breaker 18 with the glass-frit adhesive 38 is advantageous to form the insulating structure 10. The glass trim breaker 18 provides similar benefits with respect to preventing gas permeation as using the coating 114 (FIG. 6). As glass is generally impermeable by most gases, oxygen in particular, the use of a glass trim breaker 18 similarly minimizes the potential for gas permeation.

The glass-frit adhesive 38 is formed from by glass-frit bonding, which uses a wafer bonding technique with an intermediate glass layer. This bonding process typically takes place under high pressure, such as during the evacuation process of the insulating structure 10. In addition, the glass-frit adhesive 38 may be formed by grinding the glass-frit material down into a dust-like substance, or the glass-frit adhesive 38 may be ground and deposited in ball mills, typically porcelain-lined, and combined with water and a suspending agent. The glass-frit adhesive 38 further provides a minimized permeation rate, as glass is generally impermeable to gases, which prolongs the functional life of the insulating structure 10. Accordingly, the glass-frit adhesive 38 forms an additional barrier layer, in addition to the trim breaker 18, that attaches the liner 30 and the wrapper 34 to the glass trim breaker 18, and also provides a gas-blocking layer to minimize gas permeation of the insulating structure 10.

Referring again to FIGS. 1-8, the insulating cavity 50 is only defined by the metal of the liner 30 and the wrapper 34 and the glass of either the coating 114 or the glass trim breaker 18 and glass-frit adhesive 38. Accordingly, the metal liner 30 and wrapper 34 along with the glass of either the coating 114 or the trim breaker 18 and adhesive 38 form an envelope of materials that resist gas permeation. The insulating structure 10 as described may be used in a variety of locations in the appliance 14. By way of example, not limitation, the glass structures, such as the glass trim breaker 18 and adhesive 38 or the glass coating 114, of the insulating structure 10 may be used in conduits and access ports 126, for running electrical wiring and refrigeration and water pipes, within the wall of the insulating structure 10, a mullion 130 of the appliance 14, door panels 134, and other parts of the appliance 14 in which it may be advantageous to resist gas permeation.

According to the various examples, the insulating structure 10 can be used in various appliances that can include, but are not limited to, refrigerators, freezers, coolers, ovens, dishwashers, laundry appliances, water heaters, and other similar appliances and fixtures within household and commercial settings. Additionally, the insulation materials 54 can be a free-flowing material that can be poured, blown, compacted or otherwise disposed within the insulating cavity 50. This free-flowing material can be in the form of various silica-based materials, such as fumed silica, precipitated silica, nano-sized and/or micro-sided aerogel powder, rice husk ash powder, perlite, glass spheres, hollow glass spheres, cenospheres, diatomaceous earth, combinations thereof, and other similar insulating particulate material.

The invention disclosed herein is further summarized in the following paragraphs, and is further characterized by combinations of any and all of the various aspects described herein.

According to one aspect of the present disclosure, an insulating structure for an appliance includes a trim breaker, a first panel, a second panel, and an adhesive. The trim breaker defines a first groove and a second groove. The first panel is disposed within the first groove and is coupled to the trim breaker. The second panel is disposed within the second groove and is coupled to the trim breaker. The adhesive is disposed within the first and second grooves and is coupled to the first and second panels.

According to another aspect of the present disclosure, a barrier is coupled to a trim breaker and is positioned between a first panel and a second panel.

According to another aspect of the present disclosure, a coating is disposed on a barrier, wherein the coating is of a glass-type material.

According to another aspect of the present disclosure, a coating is applied under evacuation of an insulating structure.

According to another aspect of the present disclosure, a coating is formed from a chalcogenide glass.

According to another aspect of the present disclosure, a trim breaker is further defined by a third groove. An adhesive is disposed within a third groove and couples a barrier to the trim breaker.

According to another aspect of the present disclosure, an insulating cavity is defined between a first panel and a second panel. Insulation materials of a glass-type material is disposed within the insulating cavity.

According to another aspect of the present disclosure, a trim breaker is formed from a glass-type material.

According to another aspect of the present disclosure, an adhesive is a glass-frit adhesive.

According to another aspect of the present disclosure, an insulating structure for an appliance includes a glass trim breaker, a wrapper, a liner, and an adhesive. The glass trim breaker defines at least one groove. The wrapper is coupled to the trim breaker. The liner is coupled to the trim breaker and proximate to the wrapper, wherein an insulating cavity is defined between the liner and the wrapper. The adhesive is disposed within the at least one groove and is coupled to the liner and the wrapper.

According to another aspect of the present disclosure, at least one groove includes a first, second, and third groove. A liner is positioned in the first groove and a wrapper is positioned in the second groove.

According to another aspect of the present disclosure, insulation materials of a glass-type material are disposed within an insulating cavity.

According to another aspect of the present disclosure, insulation materials are disposed within an insulating cavity and are defined between a liner and a wrapper.

According to yet another aspect of the present disclosure, an insulating structure includes a trim breaker, a liner, a wrapper, and a barrier. The trim breaker defines a first groove and a second groove. The liner is positioned within the first groove and is coupled to the trim breaker. The wrapper is coupled to the trim breaker in the second groove and is proximate to the liner. The barrier is coupled to the trim breaker and extends between the wrapper and the liner. A glass coating is disposed on the barrier.

According to another aspect of the present disclosure, an adhesive is disposed within a first groove and a second groove of a trim breaker. The adhesive is coupled to a liner and a wrapper to the trim breaker.

According to another aspect of the present disclosure, a glass coating is formed from a chalcogenide glass.

According to another aspect of the present disclosure, a barrier at least partially includes glass-type materials.

According to another aspect of the present disclosure, a liner and a wrapper defines an insulating cavity therebetween. Insulation materials of a glass-type material are disposed within the insulating cavity.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An insulating structure, comprising:
 a trim breaker;
 a first panel and a second panel that are attached to the trim breaker, wherein the first and second panels partially define an insulating cavity;
 a barrier that is coupled to the trim breaker and positioned between the first and second panels; and
 a coating that is applied to the barrier under evacuation of the insulating cavity, the coating, the first panel, and the second panel defining the insulating cavity and further defining an envelope that resists gas permeation into the insulating cavity.

2. The insulating structure of claim 1, wherein insulation materials of a glass-type material are disposed within the insulating cavity.

3. The insulating structure of claim 2, wherein the coating separates the barrier from the insulation material.

4. The insulating structure of claim 1, wherein an adhesive attaches the first panel and the second panel to the trim breaker.

5. The insulating structure of claim 4, wherein the coating is formed from a glass-type material.

6. The insulating structure of claim 5, wherein the coating is formed from a chalcogenide glass.

7. The insulating structure of claim 4, wherein the barrier is adhered to the trim breaker.

8. The insulating structure of claim 1, wherein the trim breaker is formed from a glass-type material.

9. The insulating structure of claim 8, wherein an adhesive attaches the first panel and the second panel to the trim breaker, and wherein the adhesive is a glass-frit adhesive.

10. An insulating envelope for an appliance cabinet, the insulating envelope comprising:
   a trim breaker that is configured to receive a coating; and
   a first panel and a second panel that are attached to the trim breaker, wherein the coating, the first panel and the second panel define an insulating cavity, wherein the trim breaker is formed from a glass-type material, and wherein the coating incudes a glass-frit material.

11. The insulating envelope of claim 10, wherein the trim breaker includes a first groove that receives an adhesive and the first panel, and wherein the trim breaker includes a second groove that receives the adhesive and the second panel.

12. The insulating envelope of claim 11, wherein a barrier is coupled to the trim breaker and positioned between the first and second panels.

13. The insulating envelope of claim 12, wherein the coating is disposed on the barrier, wherein the glass-frit material of the coating is a glass-frit adhesive.

14. The insulating envelope of claim 13, wherein the coating is applied under evacuation of the insulating cavity.

15. The insulating envelope of claim 12, wherein the trim breaker further defines a third groove, and wherein the adhesive is disposed within the third groove and couples the barrier to the trim breaker.

16. The insulating envelope of claim 10, wherein the coating is formed from a chalcogenide glass.

17. The insulating envelope of claim 10, wherein a glass-type insulation material is disposed within the insulating cavity.

18. An insulating envelope for an appliance cabinet, the insulating envelope comprising:
   a trim breaker defining a first groove and a second groove;
   a first panel disposed within the first groove and coupled to the trim breaker using an adhesive;
   a second panel disposed within the second groove and coupled to the trim breaker using the adhesive; and
   a barrier coupled to the trim breaker between the first and second panels and adhered to the trim breaker using the adhesive that is disposed within a central groove of the trim breaker.

19. The insulating envelope of claim 18, wherein the trim breaker is formed from a glass-type material.

20. The insulating envelope of claim 18, wherein the adhesive is a glass-frit adhesive.

* * * * *